June 18, 1957

P. H. WILSON 2,795,985

JOINTS IN PIPES

Filed March 9, 1955

June 18, 1957 P. H. WILSON 2,795,985
JOINTS IN PIPES
Filed March 9, 1955 2 Sheets-Sheet 2
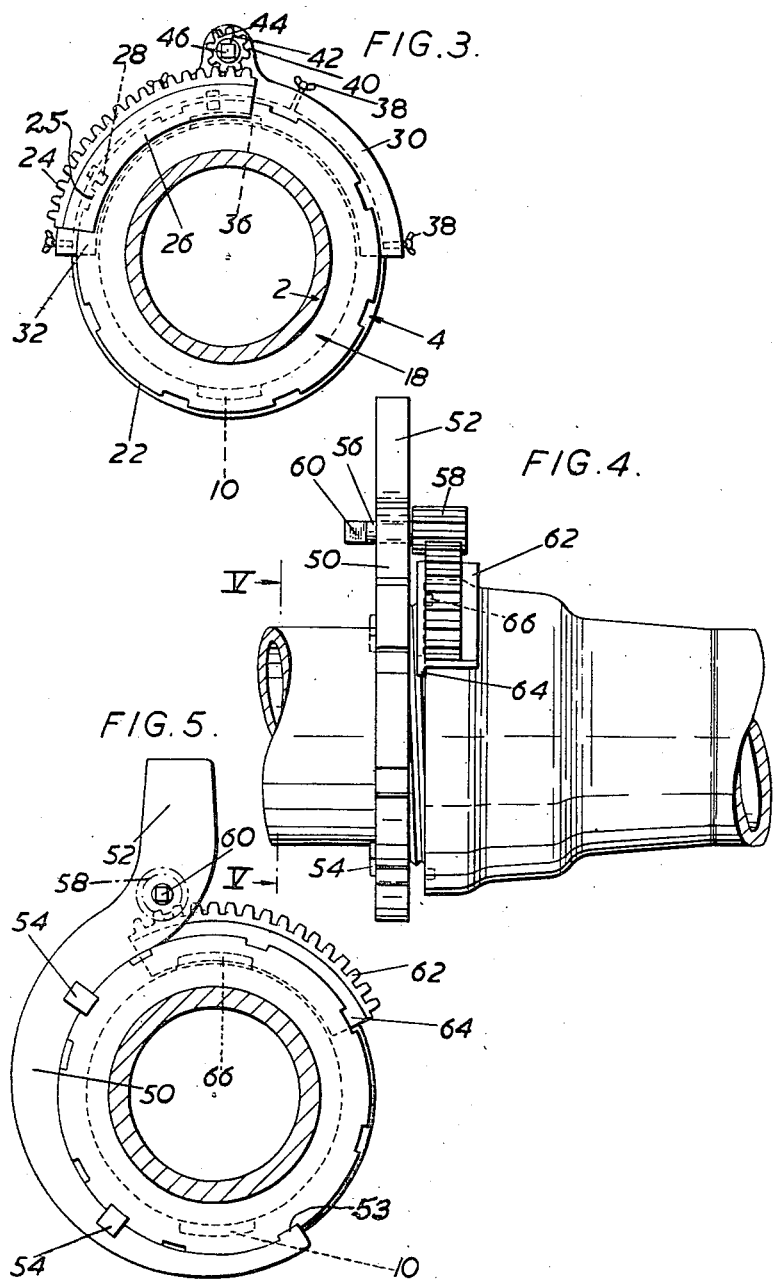

2,795,985
Patented June 18, 1957

2,795,985
JOINTS IN PIPES

Percy Hutchinson Wilson, deceased, late of Stanton-by-Dale, England, by Charles Henry Wilson, Middlesborough, England, and Arnold Wilson Lamb, Sheffield, England, executors, assignors to The Stanton Ironworks Company Limited, Stanton-by-Dale, England Application March 9, 1955, Serial No. 493,170

2 Claims. (Cl. 81—57)

This invention concerns the tightening of spigot-and-socket joints between pipes of the kind in which a seal is made by a resilient gasket which is compressed between the external surface of the spigot and a conical part of the internal surface of the socket by a gland having a continuous external thread engaging an internal thread in the socket. This type of joint is principally used on spun and cast iron pipes. The joints are also used between pipes and other components such as bends and junctions.

Rotation of the gland causes it to abut against the gasket, and by the axial movement resulting from the further screwing action to exert sufficient compressive force on the gasket to make a seal.

Hitherto the necessary rotation of the gland has been achieved by fitting to the unthreaded and castellated head of the gland a detachable C-spanner having a shaft of robust construction, and striking this shaft with a hammer of specified weight.

The principal object of the present invention is to provide a means of rotating the gland without resorting to hammering but without making any modification to the pipes and other components which would involve an alteration in their external dimensions.

According to the present invention the gland is turned relatively to the socket by cooperation of a detachable rack member and one or more pinions mounted on a detachable carrier member, one of the members engaging the gland and the other engaging the socket, and relative rotation of the socket and the latter member being prevented by entry of one or more projections on the member into notches in the internal face of the socket.

The rack member may engage the gland and the carrier member engage the socket or vice versa. The accompanying drawings show an example of each arrangement. In these drawings:

Figure 3 is a section on the line III—III in Figure 2;

Figure 4 is a side elevation of the joint with the other form of tightening apparatus fitted to it; and Figure 5 is a section on the line V—V in Figure 4.

Figure 1:
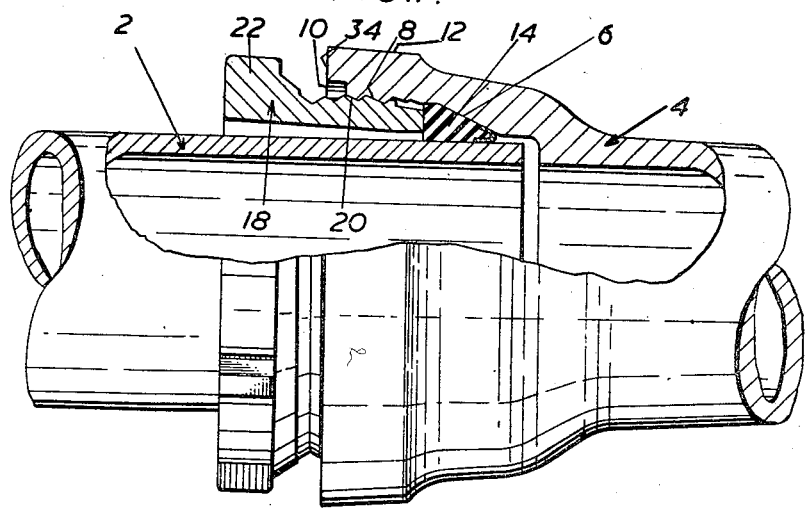
Figure 1 is a side elevation, partly in section, of a pipe joint.

The construction of the joint appears in Figure 1. The spigot end 2 of a pipe has a cylindrical external surface. The socket end 4 has an internal surface which is partly conical, at 6, and partly threaded, at 8. Two diametrically opposed notches 10 are formed in the threaded part of the socket (see also Figures 3 and 5). In the presence of these notches the pipe differs from pipes hitherto in use. The external surface 12 of the socket is free of any additional external protuberances. Hence there is no alteration of the standardised basic dimensions of the pipes, or of other components with similar ends.

A resilient gasket 14 of triangular section forms the seal. The gasket is compressed by a gland 18 having a continuous external thread 20 and a castellated head 22.

Figure 2:
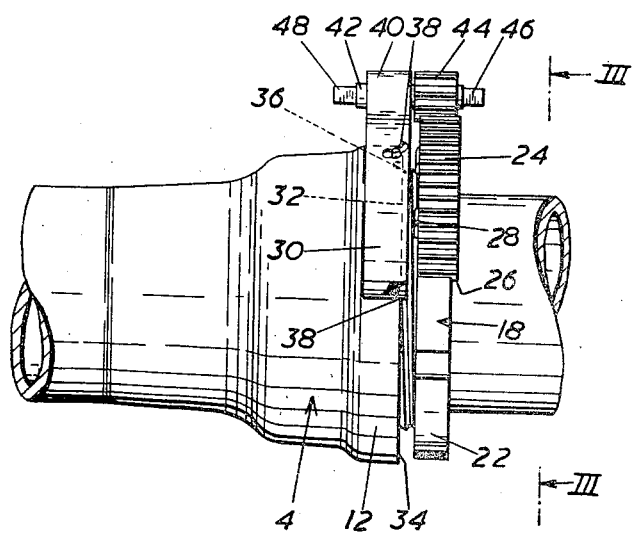
Figure 2 is a side elevation of the joint with one form of tightening apparatus fitted to it.

In the apparatus shown in Figures 2 and 3 the rack member 24 engages the gland 18 and is arcuate with an inner surface which fits the external surface of the head 22, and projections 25 which enter the notches in the head. The rack member is located axially by a flange 26, and by lugs 28 welded onto it.

The carrier member 30 engages the socket 4 and has an inner surface which fits the external surface 12 of the socket, a flange 32 which abuts the end face 34 of the socket, and an internal lug 36 on the flange which enters one of the notches 10 in the socket. The carrier member is steadied by thumb screws 38 which project radially inwards and which are tightened against the external surface of the socket. The threaded holes for the thumb screws lie as near as possible to the flange 32 on the carrier member.

The carrier member has a boss 40 in which is journalled a stub shaft 42 carrying a pinion 44 which meshes with the rack member. Both ends 46 and 48 of the stub shaft are exposed and are squared to receive ratchet spanners (not shown).

In use a joint is assembled with the gland hand-tight, the rack member and carrier member are fitted to the gland and socket, the pinion is inserted in the carrier member, the spanners are fitted to the stub shaft and then the spanners are operated until the gland has been turned sufficiently. A large mechanical advantage is obtained. Rotation of the pinion by two ratchet spanners ensures smooth movement and obviates any displacement of the pinion carrier or rack when the load on one of the ratchet spanners is released in order to operate its ratchet.

When the joint has been fully tightened by the means described, the rack member, carrier member, pinion and ratchet spanners are removed and are available for use on the next joint.

In the apparatus shown in Figures 4 and 5, the carrier member 50 resembles a C spanner with a shortened handle 52. A projection 53 on the carrier member enters one of the notches in the head of the gland. The carrier member is located axially by lugs 54. A hole in the carrier member receives a stub shaft 56 which carries a pinion 58 at one end and is squared to receive a ratchet spanner at the other end 60.

The rack member 62 has a flange 64, and an internal lug 66 on the flange which enters one of the notches 10 in the socket.

What is claimed is:

1. A device for tightening spigot-and-socket joints between pipes and like components in which a seal is made by a resilient gasket compressed between the external surface of the spigot and the internal surface of the socket by a gland having a continuous external thread engaging an internal thread in the socket, comprising a semi-circular rack member with an arcuately shaped inner surface and a semi-circular carrier member with an arcuately shaped inner surface and a pinion mounted so as to engage said rack, one of the members being adapted to engage the gland and the other being adapted to engage the socket, the latter member having projections adapted to enter notches in the internal face of the socket, and screw members adapted to bear against the external surface of the socket to further steady said member when said screws are tightened, such that relative movement of said rack member and said pinion causes rotation of the gland relative to the socket and thus compression of the resilient gasket.

2. A spigot-and-socket joint between pipes and the like comprising in combination, a spigot; a socket having an internal conical surface, an internal threaded portion disposed between said conical surface and the open end of said socket, and notches disposed in the internal face of the socket adjacent said open end; a resilient gasket disposed adjacent the conical surface between said spigot and said socket; a gland having a continuous external thread engaging said internal thread, the outer exposed surface of said gland being castellated; an arcuately shaped semi-circular detachable rack member and a detachable semi-circular carrier member having an arcuate inner surface and a pinion mounted on the outer surface, wherein one of said members comprises radial internal projections adapted to engage with the castellations of said gland, the other of said members comprising a radial flange with axial lugs adapted to engage the notches of said socket, and further comprising screw members adapted to bear against the external surface of said socket to further steady said member when said screws are tightend, such that relative movement of said rack member and said pinion causes rotation of the gland relative to the socket and thus compression of said resilient gasket.

References Cited in the file of this patent

UNITED STATES PATENTS

| | | |
|---|---|---|
| 1,017,552 | Johnston | Feb. 13, 1912 |
| 1,241,430 | Osborne | Sept. 25, 1927 |
| 1,617,125 | Thrift | Feb. 15, 1927 |
| 1,785,125 | Kalo | Dec. 16, 1930 |
| 1,861,728 | Vance et al. | June 7, 1932 |
| 1,869,915 | Sample | Aug. 2, 1932 |
| 2,060,189 | Foster | Nov. 10, 1936 |
| 2,150,611 | Speck | Mar. 14, 1939 |
| 2,282,738 | Moore | May 12, 1942 |
| 2,295,720 | Dietzmann et al. | Sept. 15, 1942 |
| 2,566,561 | Edelberg | Sept. 4, 1951 |

FOREIGN PATENTS

| | | |
|---|---|---|
| 11,944 | Great Britain | of 1915 |
| 147,889 | Switzerland | Sept. 16, 1931 |
| 508,798 | Great Britain | July 5, 1939 |